United States Patent
Shen et al.

(10) Patent No.: US 11,834,805 B2
(45) Date of Patent: Dec. 5, 2023

(54) SLOPE REPAIR METHOD

(71) Applicant: Jiangsu Lvyan Ecological Technology Co., Ltd., Jiangsu (CN)

(72) Inventors: Yifeng Shen, Jiangsu (CN); Yuqian Zhang, Jiangsu (CN); Bo Zhang, Jiangsu (CN); Jiangfeng Liu, Jiangsu (CN); Weibao Cui, Jiangsu (CN)

(73) Assignee: Jiangsu Lvyan Ecological Technology Co., Ltd., Jiangsu (CN)

( * ) Notice: Subject to any disclaimer, the term of this patent is extended or adjusted under 35 U.S.C. 154(b) by 0 days.

(21) Appl. No.: 16/966,440

(22) PCT Filed: Nov. 21, 2019

(86) PCT No.: PCT/CN2019/119954
§ 371 (c)(1),
(2) Date: Jul. 30, 2020

(87) PCT Pub. No.: WO2021/012537
PCT Pub. Date: Jan. 28, 2021

(65) Prior Publication Data
US 2022/0145569 A1    May 12, 2022

(30) Foreign Application Priority Data

Jul. 25, 2019 (CN) .......................... 201910677398.5

(51) Int. Cl.
| | | |
|---|---|---|
| *E02D 17/20* | (2006.01) | |
| *A01G 24/20* | (2018.01) | |
| *A01G 24/44* | (2018.01) | |
| *A01G 24/35* | (2018.01) | |
| *A01G 24/15* | (2018.01) | |
| *A01G 24/18* | (2018.01) | |

(52) U.S. Cl.
CPC ............ *E02D 17/202* (2013.01); *A01G 24/15* (2018.02); *A01G 24/18* (2018.02); *A01G 24/20* (2018.02); *A01G 24/35* (2018.02); *A01G 24/44* (2018.02); *E02D 2300/0034* (2013.01); *E02D 2300/0079* (2013.01)

(58) Field of Classification Search
CPC ................. E02D 17/20; E02D 17/202; E02D 2300/0034; E02D 2300/0079; A01G 24/15; A01G 24/20; A01G 24/35
See application file for complete search history.

(56) References Cited

FOREIGN PATENT DOCUMENTS

| | | | |
|---|---|---|---|
| CN | 101536634 | * | 12/2010 |
| CN | 102677684 | A | 9/2012 |
| CN | 105970978 | A | 9/2016 |
| CN | 108360516 | A | 8/2018 |
| CN | 109121862 | * | 1/2019 |
| CN | 109328809 | A | 2/2019 |
| JP | 5038071 | B2 | 10/2012 |
| KR | 20110040355 | A | 4/2011 |

OTHER PUBLICATIONS

International Search Report, PCT/CN2019/119954, dated Apr. 23, 2020, 4 pages.

* cited by examiner

*Primary Examiner* — Sean D Andrish
(74) *Attorney, Agent, or Firm* — Nelson Mullins Riley & Scarborough LLP; Anthony A. Laurentano (57) ABSTRACT

The present invention provides a slope repair method. The method includes pretreating a slope, so that an average roughness of the pretreated slope is not greater than ±8 cm to ±12 cm per linear meter; (2) hanging a hard protective mesh on the pretreated slope, where the distance between the hard protective mesh and the slope is 3-4 cm, and the hard protective mesh has an aperture size of 4-6 cm; and (3) spraying a loam-like matrix on the slope with the hard protective mesh hanged, where the loam-like matrix includes not less than $0.04/m^2$ of plant seeds; the plant seeds include tree seeds, shrub seeds and herb seeds with a mass ratio of (2.5-3.5):(4-6):(1.5-2.5). The method provided by the present invention effectively restores the mountain vegetation, and only needs 1-2 years of artificial maintenance after the restoration to form a cyclically stable ecosystem.

16 Claims, 6 Drawing Sheets

FIG. 1A

Comparison of coverage by different sprays in winter

| Winter coverage | 1st year | 2nd year | 3rd year | 5th year | 7th year | 9th year |
|---|---|---|---|---|---|---|
| Loam-like matrix | 58% | 60% | 65% | 73% | 75% | 76% |
| Ordinary spray | 30% | 35% | 40% | 41% | 40% | 45% |

FIG. 1B

Changes in the number of different species over time in the Comprehensive Ecological Management Project on Geological Environment of Closed Mine at Qinxin, Shunkeshan, Binhu District, Wuxi, China

| Species | 1st year | 2nd year | 3rd year | 5th year | 7th year | 9th year |
|---|---|---|---|---|---|---|
| Herbs | 6 | 8 | 10 | 11 | 12 | 16 |
| Trees and shrubs | 7 | 7 | 9 | 11 | 13 | 13 |

| | Total soil porosity /% | Moisture content /% |
|---|---|---|
| Before construction | 40.25 | 22.5 |
| 1st year after construction | 49.16 | 26.84 |
| 2nd year after construction | 52.51 | 27.52 |

SLOPE REPAIR METHOD

CROSS-REFERENCE TO RELATED APPLICATIONS

This application is a 35 U.S.C. 371 national stage filing of International Application No. PCT/CN2019/119954, filed Nov. 21, 2019, which claims priority to Chinese Patent Application No. 201910677398.5, filed Jul. 25, 2019. The contents of the aforementioned applications are hereby incorporated by reference.

TECHNICAL FIELD

The present invention belongs to the technical field of soil and water conservation, and particularly relates to a slope repair method.

BACKGROUND

The soil structure of the original mountain slope under natural conditions includes a completely weathered layer, a strongly weathered layer, a weakly weathered layer and bedrock. Generally, the completely weathered layer and the strongly weathered layer are damaged by human factors.

Loam-like matrix refers to an artificial matrix close to the natural loam structure. In the art, the loam-like matrix is routinely used to lay on the mountain surface to promote plant growth and development, so as to conserve soil and water and green the mountain.

The existing mountain greening projects usually adopt the mode of spray+artificial maintenance. The spray method can only create the surface layer (humus layer) of the soil. As the binding force between the surface layer and the rock (soil) surface is weak, the matrix skeleton has low support strength and is incomplete, thus failing to effectively resist the erosion of rains, winds and other external forces. The vegetation restoration effect of the spray method is particularly unsatisfactory on high slopes of undeveloped bare rock. Since herbaceous plants grow faster than woody plants, there are a few woody plants growing on the slope, whose root systems cannot bind the matrix layer on the bedrock surface. Consequently, the matrix collapses and thins year by year, making it difficult to achieve the target of vegetation restoration and harmony with the surrounding mountain landscape.

SUMMARY

In order to solve the problems as mentioned in the background, an objective of the present invention is to provide a slope repair method and a preparation method and use thereof.

The present invention provides a slope repair method, including the following steps:
(1) pretreating a slope, so that an average roughness of the pretreated slope is not greater than ±8 cm to ±12 cm per linear meter;
(2) hanging a hard protective mesh on the pretreated slope, where a distance between the hard protective mesh and the slope is 3-4 cm, and the hard protective mesh has an aperture size of 4-6 cm; and
(3) spraying a loam-like matrix on the slope with the hard protective mesh hanged, where the loam-like matrix includes not less than 0.04 kg/m² of plant seeds; the plant seeds include tree seeds, shrub seeds and herb seeds with a mass ratio of (2.5-3.5):(4-6):(1.5-2.5).

Preferably, in step (2), the hard protective mesh is a 14-16 #galvanized iron wire mesh.

Preferably, in step (2), the hard protective mesh is fixed by anchor rods having a diameter of 8-10 mm and an anchoring length of 10-15 m; a distance of each two anchor rods on the slope is 400-600 cm.

Preferably, when the slope is a mountain slope, primary anchors are provided at a distance of 0.8-1.2 m along a slope crest at a steep side of the slope; the primary anchors have a diameter of 8-10 mm and an anchoring length of 10-15 cm.

Preferably, in step (2), vegetation mats are filled between the hard protective mesh and the slope, which have a size of (55-65) cm×(30-40) cm×(12-16) cm; each two vegetation mats on the slope have a distance of 150-250 cm.

Preferably, in step (3), the loam-like matrix includes topsoil, an organic fertilizer, activated carbon, a fibrous matter, a water-retaining agent, a binder, a matrix additive and plant seeds; the mass of the topsoil in the loam-like matrix is 110-130 kg/m²; the mass of the organic fertilizer in the loam-like matrix is 3-5 kg/m²; the mass of the activated carbon in the loam-like matrix is 0.3-0.5 kg/m²; the mass of the fibrous matter in the loam-like matrix is 3-5 kg/m²; the mass of the water-retaining agent in the loam-like matrix is 0.02-0.03 kg/m²; the mass of the binder in the loam-like matrix is 0.01-0.016 kg/m²; the mass of the matrix additive in the loam-like matrix is 0.005-0.015 kg/m²; the mass of the plant seeds in the loam-like matrix is 0.04-0.05 kg/m²;

the matrix additive includes a degradable polymer material mixture, volcanic soil, vermiculite and maifanite; the degradable polymer material mixture is prepared from the following raw materials of parts by mass: 10-15 parts of starch, 0.5-1.5 parts of gibberellin, 0.2-0.8 parts of chitin and 80-90 parts of water; the degradable polymer material mixture, the volcanic soil, the vermiculite and the maifanite have a mass ratio of 2:(0.5-1.5):(0.5-1.5):(1-4).

Preferably, in step (3), the loam-like matrix includes a bottom loam-like matrix and a surface loam-like matrix; a vertical thickness of the bottom loam-like matrix on the slope is 8-12 cm, and a total vertical thickness of the loam-like matrix on the slope is 12-16 cm.

Preferably, the degradable polymer material mixture, the volcanic soil, the vermiculite and the maifanite of the matrix additive in the bottom loam-like matrix have a mass ratio of 2:(0.5-1.5):(0.5-1.5):(2-4).

Preferably, the degradable polymer material mixture, the volcanic soil, the vermiculite and the maifanite of the matrix additive in the surface loam-like matrix have a mass ratio of 2:(0.5-1.5):(0.5-1.5):(1-3).

Preferably, the slope repair method further includes 1-2 years of artificial maintenance after the loam-like matrix is sprayed.

The present invention provides a slope repair method, including the following steps: (1) pretreating a slope, so that an average roughness of the pretreated slope is not greater than ±8 cm to ±12 cm per linear meter; (2) hanging a hard protective mesh on the pretreated slope, where a distance between the hard protective mesh and the slope is 3-4 cm, and the hard protective mesh has an aperture size of 4-6 cm; and (3) spraying a loam-like matrix on the slope with the hard protective mesh hanged, where the loam-like matrix includes not less than 0.04 kg/m² of plant seeds; the plant seeds include tree seeds, shrub seeds and herb seeds with a mass ratio of (2.5-3.5):(4-6):(1.5-2.5). The method provided by the present invention effectively restores the mountain vegetation, and only needs 1-2 years of artificial maintenance after the restoration to form a cyclically stable ecosystem.

BRIEF DESCRIPTION OF DRAWINGS

FIGS. 1A-1B show a comparison of vegetation cover by a loam-like matrix spray and an ordinary spray according to Example 3 of the present invention.

FIGS. 2A-2B show a change in the number of species based on a sampling survey on the Comprehensive Ecological Management Project on Geological Environment of Closed Mine at Dongjiaoshan, Xishan District, Wuxi, China according to Example 3 of the present invention. FIGS. 3A and 3B show a soil thickness measured in the Comprehensive Ecological Management Project on Geological Environment of Closed Mine at Dongjiaoshan, Xishan District, Wuxi, China according to Example 3 of the present invention.

FIGS. 4A-4G show a measurement and evaluation result of a hydrological effect and an infiltration capacity of a mountain slope after treatment according to Example 3 of the present invention.

DETAILED DESCRIPTION

The present invention is further described below with reference to the examples and accompanying drawings.

The present invention provides a slope repair method. In the present invention, the slope preferably includes mountain slopes, high steep slopes of highways and railways and slope protection of river embankments, and more preferably includes mountain slopes.

The slope repair method provided by the present invention includes the following steps:

(1) pretreat a slope, so that an average roughness of the pretreated slope is not greater than ±8 cm to ±12 cm per linear meter;

(2) hang a hard protective mesh on the pretreated slope, where a distance between the hard protective mesh and the slope is 3-4 cm, and the hard protective mesh has an aperture size of 4-6 cm; and (3) spray a loam-like matrix on the slope with the hard protective mesh hanged, where the loam-like matrix includes not less than 0.04 kg/m$^2$ of plant seeds; the plant seeds include tree seeds, shrub seeds and herb seeds with a mass ratio of (2.5-3.5):(4-6):(1.5-2.5).

The present invention first pretreats the slope by clearing loose stones and debris on the slope, so as to ensure that the slope is smooth to lay wire meshes. In the present invention, the pretreatment is carried out to make the average roughness of the pretreated slope preferably not greater than ±8 cm to ±12 cm per linear meter, and more preferably not greater than ±10 cm per linear meter. The present invention preferably roughens a smooth rock surface by measures such as intensifying anchor rods or digging transverse trenches to prevent the base from sliding down. Some back slopes are backfilled with ecological vegetation mats.

After the slope is pretreated, the present invention hangs a hard protective mesh on the slope. In the present invention, the distance between the hard protective mesh and the slope is 3-4 cm, preferably 3.5 cm. The hard protective mesh has an aperture size of preferably 4-6 cm, and more preferably 5 cm. The hard protective mesh is preferably a metal mesh, and more preferably a galvanized iron wire mesh. The galvanized iron wire mesh is preferably a 14-16 #galvanized iron wire mesh with an iron wire diameter ranging from 1.626 mm to 2 mm.

In the present invention, the hard protective mesh is preferably fixed by anchor rods. The anchor rods preferably have a diameter of 8-10 mm and an anchoring length of 10-15 cm. The anchor rods are preferably distributed in a diamond shape, and the distance of each two anchor rods on the slope is preferably 400-600 cm, and more preferably 500 cm. When the slope is a mountain slope, primary anchors are preferably provided at a distance of 0.8-1.2 m (more preferably 1 m) along a slope crest at a steep side of the slope. The primary anchors preferably have a diameter of 8-10 mm and an anchoring length of 10-15 cm. L-shaped anchors are preferably provided for some uneven slope faces. The L-shaped anchors are fastened to ensure that the metal mesh is attached to the slope face, thereby completing the laying of the slope base structure.

In the present invention, vegetation mats are preferably filled between the hard protective mesh and the slope. The size of the vegetation mats is preferably (55-65) cm×(30-40) cm×(12-16) cm, and more preferably 60 cm×35 cm×14 cm. The vegetation mats are preferably placed in a diamond shape, and the distance between each two vegetation mats on the slope is 150-250 cm. The vegetation mats create a site condition for vegetation growth.

After the hard protective mesh is hung, the present invention sprays the loam-like matrix to the slope with the hard protective mesh hanged. The loam-like matrix preferably includes not less than 0.04 kg/m$^2$ of plant seeds. The plant seeds include tree seeds, shrub seeds and herb seeds with a mass ratio of preferably (2.5-3.5):(4-6):(1.5-2.5), and more preferably 3:5:2. In a more specific solution of the present invention, the mass ratio of evergreen tree seeds to deciduous tree seeds is preferably (3-5):(5-7), and more preferably 4:6. The present invention has no special limit on the species of the seeds, and plant seeds suitable for the local climate environment of the slope to be repaired and available on the market can be used. All seeds are preferably subjected to germination tests and pre-germination treatments before use. Alien species must be provided with a quarantine report, and the quality of grassy seeds should not be lower than the second-level standard specified in GB 6142-2008.

In the present invention, the loam-like matrix preferably includes topsoil, an organic fertilizer, activated carbon, a fibrous matter, a water-retaining agent, a binder, a matrix additive and plant seeds. The mass of the topsoil in the loam-like matrix is preferably 110-130 kg/m$^2$, and more preferably 120 kg/m$^2$. The mass of the organic fertilizer in the loam-like matrix is preferably 3-5 kg/m$^2$, and more preferably 4 kg/m$^2$. The mass of the activated carbon in the loam-like matrix is preferably 0.3-0.5 kg/m$^2$, and more preferably 0.4 kg/m$^2$. The mass of the fibrous matter in the loam-like matrix is preferably 3-5 kg/m$^2$, and more preferably 4 kg/m$^2$. The mass of the water-retaining agent in the loam-like matrix is preferably 0.02-0.03 kg/m², and more preferably 0.025 kg/m². The mass of the binder in the loam-like matrix is preferably 0.01-0.016 kg/m², and more preferably 0.013 kg/m². The mass of the matrix additive in the loam-like matrix is preferably 0.005-0.015 kg/m², and more preferably 0.01 kg/m². The mass of the plant seeds in the loam-like matrix is preferably 0.04-0.05 kg/m², and more preferably 0.045 kg/m².

In the present invention, the matrix additive preferably includes a degradable polymer material mixture, volcanic soil, vermiculite and maifanite. The degradable polymer material mixture, the volcanic soil, the vermiculite and the maifanite preferably have a mass ratio of 2:(0.5-1.5):(0.5-1.5):(1-4). Preferably, the degradable polymer material mixture is prepared from the following raw materials of parts by mass: 10-15 parts of starch, 0.5-1.5 parts of gibberellin, 0.2-0.8 parts of chitin and 80-90 parts of water. More preferably, the degradable polymer material mixture is prepared from the following raw materials of parts by mass: 15 parts of starch, 1 part of gibberellin, 0.5 parts of chitin and 85.5 parts of water.

In the present invention, the loam-like matrix preferably includes a bottom loam-like matrix and a surface loam-like matrix. The vertical thickness of the bottom loam-like matrix on the slope is preferably 8-12 cm. When the slope is a soil slope, the vertical thickness of the bottom loam-like matrix on the slope is preferably 8-10 cm. When the slope is a rock slope, the vertical thickness of the bottom loam-like matrix on the slope is preferably 10-12 cm. The total vertical thickness of the loam-like matrix on the slope is preferably 12-16 cm, and more preferably 13-15 cm.

In the present invention, the degradable polymer material mixture, the volcanic soil, the vermiculite and the maifanite of the matrix additive in the bottom loam-like matrix have a mass ratio of preferably 2:(0.5-1.5):(0.5-1.5):(2-4), and more preferably 2:1:1:3. The degradable polymer material mixture, the volcanic soil, the vermiculite and the maifanite of the matrix additive in the surface loam-like matrix have a mass ratio of preferably 2:(0.5-1.5):(0.5-1.5):(1-3), and more preferably 2:1:1:2.

The slope repair method provided by the present invention reconstructs the soil structure and controls the planting ratio of trees, shrubs and herbs to prevent rain erosion effectively. The present invention has excellent water holding capacity and permeability, and is adaptable to various slopes. Artificial maintenance is no longer needed after the tree seeds grow for 1-2 years (generally 1 year in southern China and 2 years in northern China), and the similarity between the slope and the surrounding mountain landscape is more than 90% after 3 years.

The present invention is described in further detail below with reference to the specific examples which are implemented based on the technical solutions of the present invention. It should be noted that the examples are merely intended to illustrate the present invention, rather than to limit the scope of the present invention.

Example 1

(1) Preparation Stage Before Construction
1.1 Slope Stability Analysis

A geological survey was carried out on a mine slope project to be treated to find out the basic characteristics of the slope and the physical and mechanical properties of rock and soil. The rock mass structure of the slope was divided, and the failure mode of the slope was determined accordingly. The shear strength was calculated through limit equilibrium analysis and deformation analysis, and the stability of the slope and the stress conditions of the rock mass, such as the weight of the rock mass, blasting force, engineering force and groundwater action were analyzed. The change trend of slope stability was determined from the geological origin. The slope stability was determined, and slope reinforcement was carried out in case of low stability.

1.2 Slope Risk Reduction, Slope Cutting and Load Reduction

If the slope was excessively high and steep, the load of the slope was reduced by cutting, and the height and gradient (to be ≤73°) of the slope were also appropriately reduced. The slope was cleared and leveled by machinery supplemented by manpower. The top of the slope was cut in the proportion of 1:(0.5-0.75) to reduce the risk thereof. Large protrusions and depressions were removed by leveling, and dangerous rock slopes were smoothly connected to the surroundings.

1.3 Hydrological Survey and Water System Layout of Slope

The natural runoff of the original slope water system was fully investigated. According to the construction situation, the slope water system was designed and the drainage system and irrigation system were arranged. After the leveling construction was completed, drainage ditches were laid at the slope toe to prevent rainwater from impacting the slope soil and invading the vegetation, so as to mitigate soil erosion.

1.4 Habitat Research and Plant Variety Selection

The data of plant communities and meteorology of local mountains or slopes were collected. By fully considering the diversity of plant species, pioneer plants beneficial to vegetation restoration and plant varieties suitable for local growth (preferentially, native species) were chosen. According to the needs of the slope landscape, a slope bench was set up, and the colors and leaves of the plant varieties were matched.

(2) Laying of Slope Base Structure
2.1 Slope Pretreatment

Loose stones and debris on the slope were cleared to ensure that the slope was smooth to lay wire meshes. Before construction, the average roughness of the pretreated slope was not greater than ±8 cm to ±12 cm per linear meter. The smooth rock surface was roughened by measures such as intensifying anchor rods or digging transverse trenches to prevent the base from sliding down. Some back slopes were backfilled with ecological vegetation mats.

2.2 Laying of Slope Base Structure

The meshes were hanged and anchor rods were constructed on the face of the slope. The metal meshes (aperture size 4-6 cm) were buried in the intercepting ditch or soil on the crest of the slope, and laid to the shoulder of the slope from top to bottom. Adjacent metal meshes were connected flatly with an overlapping distance of less than 10 cm. They were fixed with thin iron wires, and maintained a gap of 3-4 cm with the slope face. Primary anchors were disposed along the crest of the slope on the steep side of the slope, one primary anchor per meter. The primary anchors were firmly connected by iron wires so that the metal meshes adhered to the face of the slope. L-shaped anchors were provided for some uneven slope faces to ensure that the metal meshes were attached to the slope face. The L-shaped anchors were fastened, thus completing the laying of the slope base structure.

(3) Preparation of Loam-Like Matrix
3.1 Matrix Preparation

According to the formula shown in Table 1, the loam-like matrix additive was added as the main component, and then the topsoil, organic fertilizer, fibrous matter and binder were added and mixed well to form the loam-like matrix. The moisture content of the mixed loam-like matrix was controlled between the optimal moisture content and plastic limit of the soil, and the mixed loam-like matrix was stored for later use.

TABLE 1

Formula of loam-like matrix

| Components | Specification Bottom layer | Specification Surface layer | kg/m² | Remarks |
|---|---|---|---|---|
| Topsoil | Soil | | 110-130 | Sieved surface planting soil with a pore size of 100 mm |
| Organic fertilizer | Decomposed animal feces with a moisture content of less than 30% | | 3-5 | Local |
| Activated carbon | Industrial activated carbon with a moisture content below 15% | | 0.3-0.5 | |
| Fibrous matter | Fiber | | 3-5 | Straw, rice hulls or rotten wood chips |
| Water-retaining agent | Water absorption capacity ≥300 | | 0.02-0.03 | Insoluble in water |
| Binder | Viscosity ≥1300 CPS | Viscosity ≥700 CPS | 0.013 | Soluble in water |
| Loam-like additive of Example 1 | Bottom matrix additive | Surface additive | 0.01 | Skeleton construction, rooting, water retention |

The components in Table 1 are described as follows:
Topsoil: surface planting soil with rich humus and good physical properties; pore size 100 mm; sieved; not including soil with reducing harmful substances from excessively wet land;
Organic fertilizer: decomposed feces with a moisture content of less than 30%;
Activated carbon: industrial type activated carbon with a water content of less than 15%; mainly used to adsorb trace heavy metals and retain water;
Fibrous matter: grass fiber, 2-4.5 cm in length and 2-3 mm in width;
Water-retaining agent: powder, pH 3-9, water absorption capacity >400 g/g, water absorption rate <20 min; insoluble in water;
Binder: degradable polymer material, soluble in water; bottom viscosity >1,500 CPS, surface viscosity <800 CPS;
Matrix (prepared depending on slope conditions): bulk density 0.75 g/cm³ to 1.25 g/cm³, and water content 30% to 35%; organic matter ≥10%; nitrogen content ≥3.0 g/kg; total phosphorus (TN)≥1.2 g/kg; total potassium (TP)≥8.0 g/kg; pH 5.5-8; electrical conductivity (EC): 0.38 ms/cm to 4.2 ms/cm; cation exchange capacity (CEC) of soil ≥140 mmol/kg.

3.2 Preparation of Spray Seeds

According to Section 1.4, the spray seeds were composed of tree, shrub and herb seeds with a ratio of 3:5:2, and sown with an amount less than 0.05 kg/m². All seeds were subjected to germination tests and pre-germination treatments before use. Alien species were provide with a quarantine report, and the quality of grass seeds were not be lower than the second-level standard specified in GB 6142-2008.

(4) Spraying of Loam-Like Matrix
4.1 Spraying of Bottom Loam-Like Matrix (to Simulate Eluvial Layer and Strongly Weathered Layer)

Specialized spraying equipment was used by professionals to send the bottom loam-like matrix to a spray nozzle, and water was added to the spray nozzle to mix with the bottom matrix materials. After the mixing, the bottom matrix was sprayed to the slope face and the metal meshes. The average thickness of the bottom matrix was 8-10 cm on a general soil slope and appropriately increased on a rock slope.

4.2 Spraying of Surface Loam-Like Matrix (to Simulate Humus Layer and Completely Weathered Layer)

After the average thickness of the bottom matrix sprayed at the first time reached a standard value, the seeds were mixed into the surface loam-like matrix, and special spraying equipment was used to send the surface matrix materials to the spray nozzle for second spraying. The second spraying was ended when the average thickness of the loam-like matrix mixture sprayed twice reached 12-16 cm.

(5) Follow-Up Maintenance

Artificial maintenance was carried out in a period of time after the end of the spraying of the loam-like matrix, including covering with a non-woven fabric, watering, fertilization, pest control, replanting and later monitoring. The technical system provided by the present invention was used to treat and restore a mine, and formed a cyclically stable ecosystem not needing artificial maintenance generally within 1 year in southern China and 2 years in northern China.

Example 2

Comprehensive Ecological Management Project on Geological Environment of Closed Mine, Dongjiaoshan, Xishan District, Wuxi, China. This example differs from Example 1 in the preparation and spraying methods of the loam-like matrix.

The loam-like matrix was prepared as follows:
(1) Preparation of Surface Matrix Additive Starch, gibberellin, chitin and water were blended in a mass ratio of 13:1:0.5:85.5 at room temperature (25° C.). The starch weighed in proportion was first dissolved in water and mixed well. After the starch was completely dissolved, the chitin weighed in proportion was added to the starch aqueous solution and mixed well. Finally, the gibberellin weighed in proportion was added to form the degradable polymer material mixture.

The degradable polymer material mixture, the volcanic soil, the vermiculite and the maifanite were mixed well in a weight ratio of 2:1:1:2 at room temperature to form the surface matrix additive.

(2) Preparation of Surface Loam-Like Matrix

According to the formula shown in Table 2, the surface loam-like matrix additive was added as the main component, and then the topsoil, organic fertilizer, fibrous matter and binder were added and mixed well to form the loam-like matrix. The moisture content of the mixed loam-like matrix was between the optimal moisture content and plastic limit of the soil, and the mixed loam-like matrix was stored for later use.

maifanite had a weight ratio of 2:1:1:2. They were used to strengthen the matrix particle skeleton and create pores, so as to help woody plant roots to extend into the soil. The anti-transpiration ability of the surface of the matrix was enhanced. The surface gaps of the composite soil mixed with plant fiber were reduced due to the surface tension of the matrix interface under strong ultraviolet radiation, and expanded at night with high humidity or under weak light to absorb and store the humidity.

TABLE 2

Formula of surface loam-like matrix

| Components | Specification Surface layer | kg/m² | Remarks |
|---|---|---|---|
| Topsoil | Soil | 27.5-32.5 | Sieved surface planting soil with a pore size of 100 mm |
| Organic fertilizer | Decomposed animal feces with a moisture content of less than 30% | 0.75-1.25 | Local |
| Activated carbon | Industrial activated carbon with a moisture content below 15% | 0.075-0.125 | |
| Fibrous matter | Fiber | 0.75-1.25 | Straw, rice hulls or rotten wood chips |
| Water-retaining agent | Water absorption capacity ≥300 | 0.005-0.0075 | Insoluble in water |
| Binder | Viscosity ≥700 CPS | 0.00325. | Soluble in water |
| Matrix additive in step (1) | Surface additive | 0.0025. | Skeleton construction, rooting, water retention |

The components in Table 2 are described as follows:

Topsoil: surface planting soil with rich humus and good physical properties; pore size 100 mm; sieved; not including soil with reducing harmful substances from excessively wet land;

Organic fertilizer: decomposed feces with a moisture content of less than 30%;

Activated carbon: industrial activated carbon with a moisture content below 15%;

Fibrous matter: grass fiber, 3-5 cm in length and 2-3 mm in width;

Water-retaining agent: powder, pH 3-9, water absorption capacity >400 g/g, water absorption rate <20 min; insoluble in water;

Binder: degradable polymer material (such as polyethylene polymer material), soluble in water, surface viscosity >800 CPS;

Matrix (prepared depending on the slope conditions): bulk density 0.75 g/cm³ to 1.0 g/cm³, and water content 31% to 35%. The polymer material, volcanic soil, vermiculite and (3) Preparation of Bottom Matrix Additive Starch, gibberellin, chitin and water were blended in a mass ratio of 13:1:0.5:85.5 at room temperature (25° C.). The starch weighed in proportion was first dissolved in water and mixed well. After the starch was completely dissolved, the chitin weighed in proportion was added to the starch aqueous solution and mixed well. Finally, the gibberellin weighed in proportion was added to form the degradable polymer material mixture.

The degradable polymer material mixture, the volcanic soil, the vermiculite and the maifanite were mixed well in a weight ratio of 2:1:1:3 at room temperature to form the bottom matrix additive.

(4) Preparation of Bottom Loam-Like Matrix

According to the formula shown in Table 3, the bottom loam-like matrix additive was added as the main component, and then the topsoil, organic fertilizer, fibrous matter and binder were added and mixed well to form the loam-like matrix. The moisture content of the mixed loam-like matrix was controlled between the optimal moisture content and plastic limit of the soil, and the mixed loam-like matrix was stored for later use.

TABLE 3

Formula of bottom loam-like matrix

| Components | Specification Bottom layer | kg/m² | Remarks |
|---|---|---|---|
| Topsoil | Soil | 82.5-97.5 | |
| Organic fertilizer | Decomposed animal feces with a moisture content of less than 30% | 2.25-3.75 | Local |
| Activated carbon | Industrial activated carbon with a moisture content below 15% | 0.225-0.375 | |
| Fibrous matter | Fiber | 2.25-3.75 | Straw, rice hulls or rotten wood chips |
| Water-retaining agent | Water absorption capacity ≥300 | 0.015-0.0225 | Insoluble in water |

TABLE 3-continued

Formula of bottom loam-like matrix

| Components | Specification Bottom layer | kg/m² | Remarks |
|---|---|---|---|
| Binder | Viscosity ≥1300 CPS | 0.00975. | Soluble in water |
| Matrix additive in step (3) | Bottom matrix additive | 0.0075. | Skeleton construction, rooting, water retention |

The components in Table 3 are described as follows:

Topsoil: surface soil with rich humus and good physical properties

Organic fertilizer: decomposed feces with a moisture content of less than 30%;

Activated carbon: Industrial activated carbon with a moisture content below 15%;

Fibrous matter: grass fiber, 3-5 cm in length and 2-3 mm in width;

Binder: polymer material (such as polyethylene polymer material), soluble in water, bottom viscosity >1,500 CPS;

Water-retaining agent: powder, pH 3-9, water absorption capacity >400 g/g, water absorption rate <20 min; insoluble in water;

Matrix (prepared depending on the slope conditions): bulk density 1.0 g/cm³ to 1.25 g/cm³, and water content 30% to 31%. The polymer material, volcanic soil, vermiculite and maifanite were mixed in a weight ratio of 2:1:1:3 to strengthen the matrix particle skeleton. The amount of the binder was 1.5 times the amount on the surface layer. The binder strongly adhered to the rock surface until the roots of the trees and shrubs penetrated into the rock mass (or uneven parts) to form a natural anchoring state three years later.

The mountain slope was treated according to the method in this example to form the following structural layers:

1) Bottom layer: It was mainly a simulated strongly weathered layer (eluvial layer) of the soil, which had high strength and erosion resistance and allowed the matrix to better adhere to the bedrock of the mine slope.
2) Surface layer: It was mainly a simulated completely weathered layer (humus layer) of the soil, which was rich in minerals, air, water and organic matter to promote seed germination and soil and water conservation.

The mass ratio of the bottom layer to the surface layer was about 3:1. The bottom and surface layers provided sufficient water and nutrients for plant growth for a long time. They effectively increased the overwintering rate and greening rate of vegetation in special areas such as arid and semi-arid areas.

The seeds were blended into the surface layer of the soil matrix and had certain strength and stability. The litter formed after plant growth interacted with the loam-like matrix to form a new organic horizon to provide nutrients for the later growth of the plants, thereby establishing a cyclically stable ecosystem not needing artificial maintenance.

The loam-like matrix was sprayed as follows:

(1) Spraying of Bottom Loam-Like Matrix

The spraying was implemented with systematic spraying equipment. The loam-like bottom matrix was mixed mechanically, and sprayed by an air compressor to the rock (soil) surface with an anchoring mesh. The spraying thickness was 5-6 cm, and could be increased by 1-2 cm on the depression of the rock surface.

(2) Spraying of Surface Loam-Like Matrix

The surface loam-like matrix was sprayed one week after the bottom loam-like matrix was sprayed. The herb and tree seeds were treated, mixed and sprayed to the bottom layer, with a thickness of 7-9 cm.

Example 3

The effect of the mountain slope repair method in Example 2 was measured.

(1) Cover: Cover is an important intuitive indicator to measure the vegetation restoration of damaged mountain slopes. A large cover shows that the newly established plant community is good and the environment is improved.

Figure 1A:
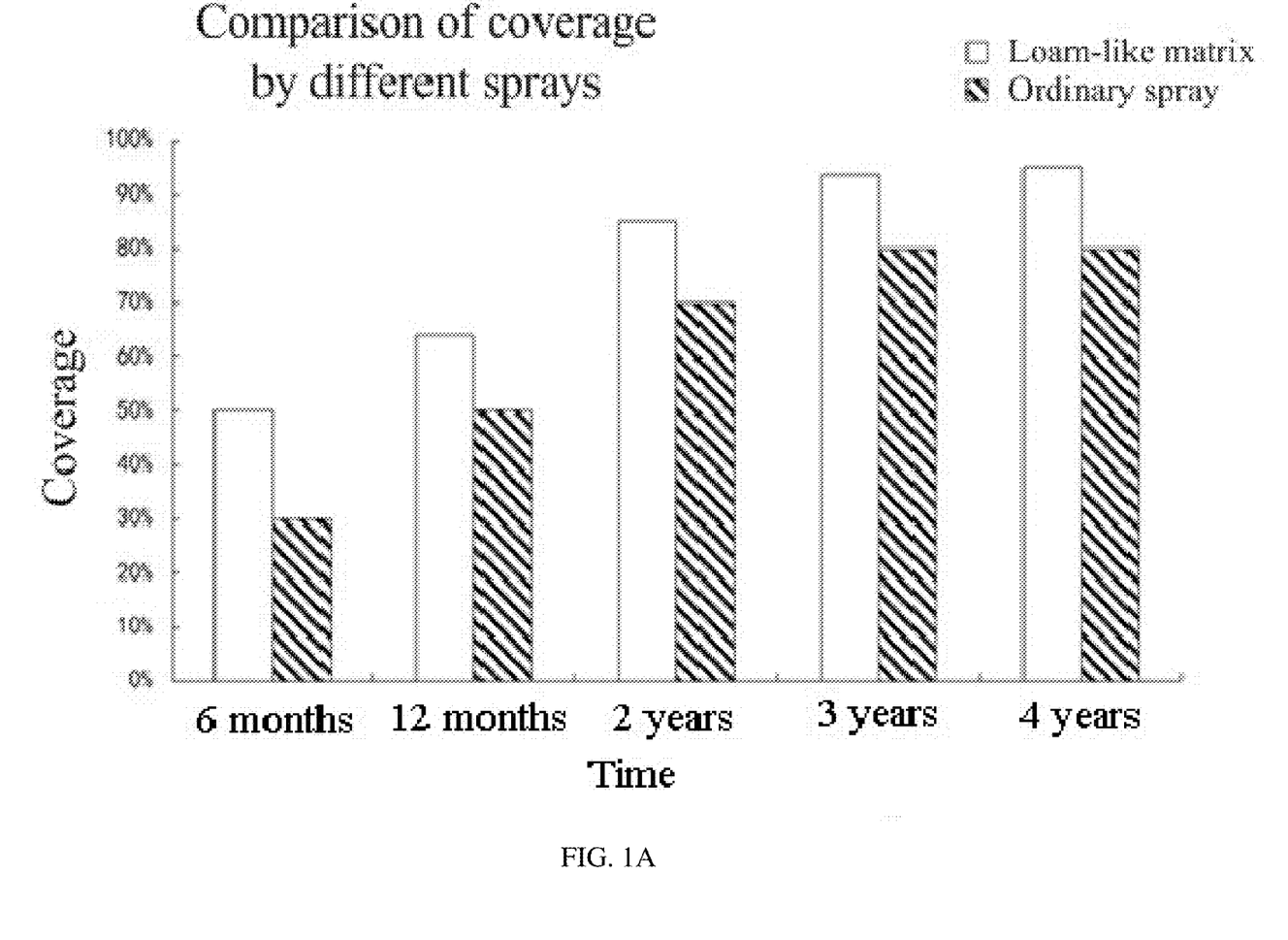
FIG. 1A is a bar plot showing a comparison of coverage by different sprays.
Figure 1B:
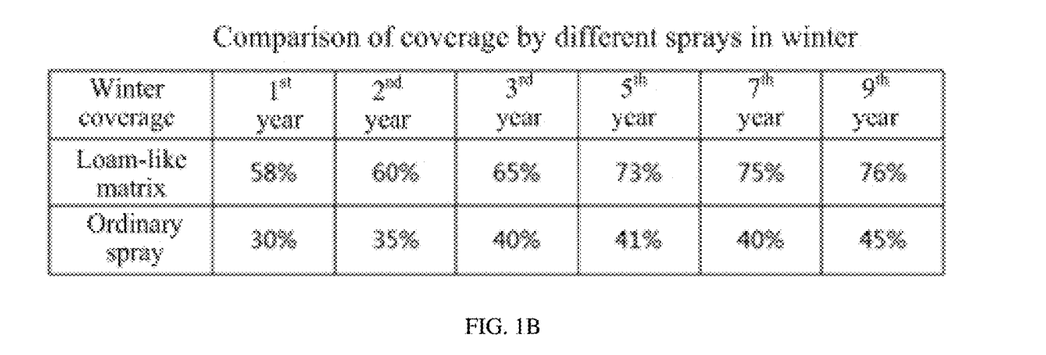
FIG. 1B is a table showing a comparison of coverage by different spays in winter.

The cover was surveyed by a combination of drones and manual investigations. The vegetation cover of the loam-like matrix spray was compared with that of an ordinary spray, as shown in FIG. 1. FIG. 1 shows that, 1) the vegetation cover of the two construction methods increased rapidly at the beginning, and then basically stabilized with time; and 2) the vegetation cover of the loam-like matrix spray was higher than that of the ordinary spray.

(2) Diversity: Diversity is an important indicator of community succession, and a key indicator to measure the mine restoration results. The establishment and normal succession of new vegetation communities on damaged mountains must respect the laws of nature, and the proportions should also refer to the natural conditions.

Figure 2A:
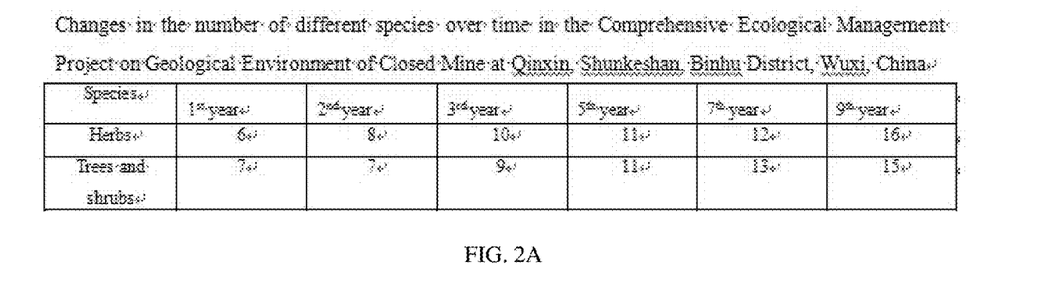
FIG. 2A is a table showing the change in the number of species.
Figure 2B:
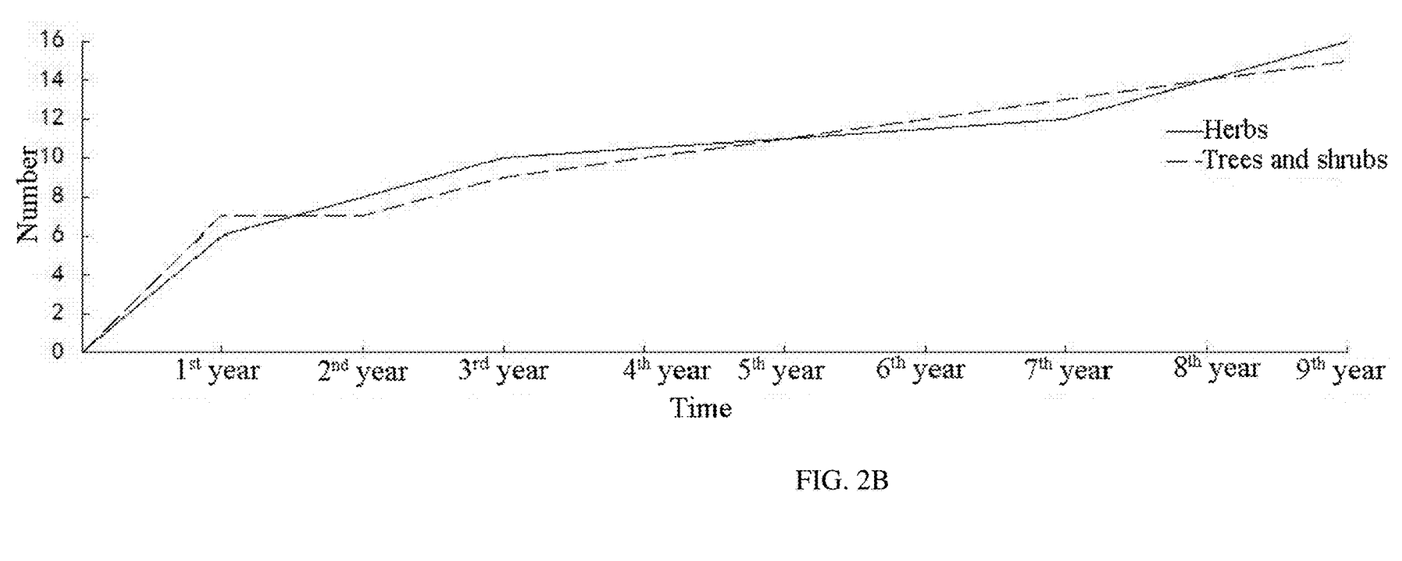
FIG. 2B is a line chat showing the change in the number of species

The diversity was surveyed using a quadrat method. The sample plots were 5×5 m², and the sampling points on the slope occupied not less than 10% of the total area. The sample plots were chosen from four locations on different high slope faces of the mountain (chosen once at a height of 30 m, no less than 5 plots each time). The sampling survey of the Comprehensive Ecological Management Project on Geological Environment of Closed Mine at Dongjiaoshan, Xishan District, Wuxi, China was conducted twice (winter and summer) a year. The results are shown in Table 4 and FIG. 2.

TABLE 4

Number of trees and shrubs changing with time (100 m²)

| Time | 1st year | 2nd year | 3rd year | 5th year | 7th year | 9th year |
|---|---|---|---|---|---|---|
| Robinia pseudoacacia | 20 | 16 | 13 | 12 | 9 | 9 |
| Ailanthus altissima | 11 | 10 | 9 | 8 | 7 | 7 |
| Ligustrum compactum | 51 | 43 | 40 | 36 | 33 | 32 |
| Photinia serratifolia | 31 | 25 | 22 | 21 | 19 | 19 |
| Pyracantha fortuneana | 20 | 19 | 18 | 16 | 15 | 15 |

Table 4 and FIG. 2 show that, the number of woody plants was relatively stable in the 1st to 2nd years and gradually increased afterwards; the number of herbaceous plants grew slowly, but suddenly increased in the 7$^{th}$ year due to wind or bird propagation. The plants' growth in the 1$^{st}$ to 2$^{nd}$ years was subjected to artificial interference. Since then, the effect of the matrix soil environment and the interference of the natural environment together brought the plant community closer to the wild state.

The mountain slope repair method (especially the use of the loam-like matrix) provided by the present invention changed the appearance of the damaged mountain. New plant communities were formed and succeeded to the natural state, and wind and birds brought surrounding species, making the communities gradually wild. The permanent restoration was achieved without artificial maintenance from the 2$^{nd}$ year onwards, and the new mountain appearance was integrated with the original one, with the similarity increasing year by year.

Plant height growth is a key technical indicator to measure the repair of damaged mountains. The present invention investigated the plant height growth of the tree and shrub species, and the results are shown in Table 5.

TABLE 5

Plant height growth of tree and shrub species changing with time (cm)

| Time | 1$^{st}$ year | 2$^{nd}$ year | 3$^{rd}$ year | 5$^{th}$ year | 7$^{th}$ year | 9$^{th}$ year |
|---|---|---|---|---|---|---|
| Robinia pseudoacacia | 50 | 120 | 210 | 420 | 620 | 900 |
| Ailanthus altissima | 40 | 150 | 250 | 400 | 600 | 800 |
| Ligustrum compactum | 30 | 80 | 120 | 150 | 185 | 220 |
| Photinia serratifolia | 25 | 40 | 60 | 110 | 130 | 150 |
| Pyracantha fortuneana | 26 | 40 | 80 | 140 | 160 | 170 |
| Pittosporum tobira | 12 | 30 | 55 | 80 | 100 | 130 |

Table 5 shows that the growth of the woody plants in the nine years was stable, proving that the species used were reasonable.

The present invention chose species with strong local tolerance based on the function, size, adaptability, periodicity, control, continuity of plants, and their impact on the natural environment.

Figure 3A:
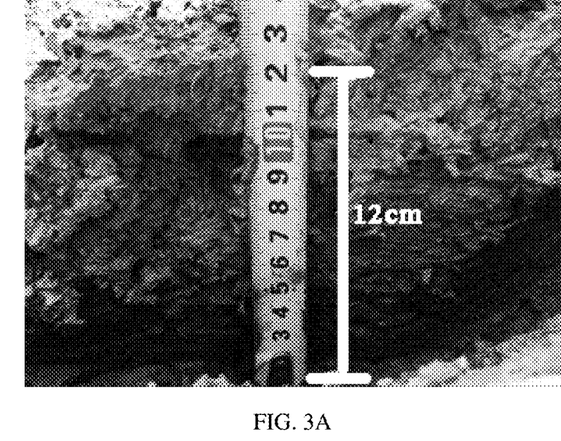
FIG. 3A shows a soil thickness at the end of matrix spraying.
Figure 3B:
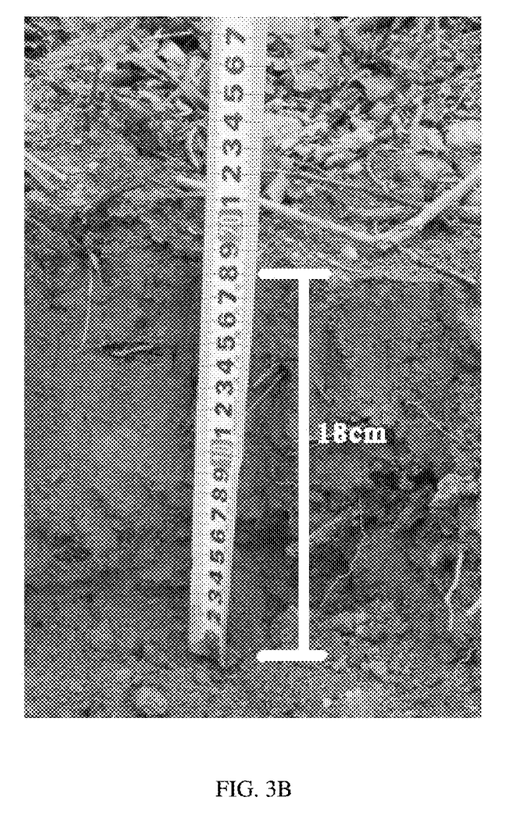
FIG. 3B shows a soil thickness after 9 years of treatment.
Figure 4A:
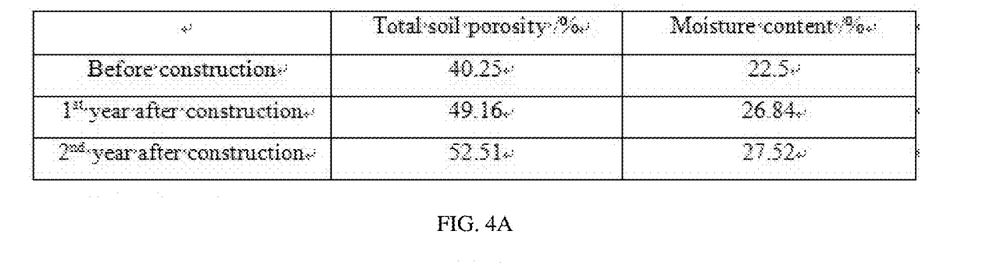
FIG. 4A is a table summarizing the measurement and evaluation result.
Figure 4B:
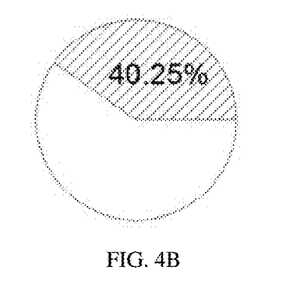
FIGS. 4B-4D are pie charts showing the total soil porosity before and after 1 and 2 years of treatment, respectively.
Figure 4C:
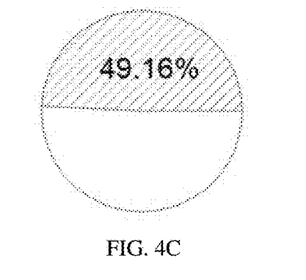
Figure 4D:
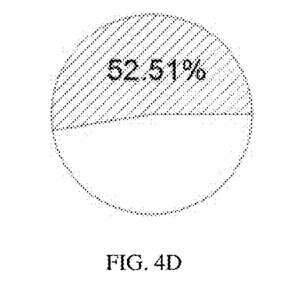
Figure 4E:
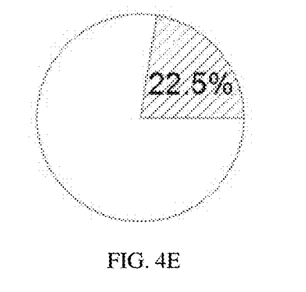
FIG. 4E-4G are pie charts showing the moisture contents before and after 1 and 2 years of treatment, respectively.
Figure 4F:
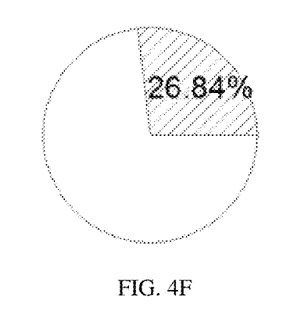
Figure 4G:
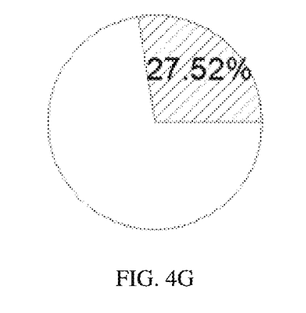

(3) The soil thickness in the Comprehensive Ecological Management Project on Geological Environment of Closed Mine at Dongjiaoshan, Xishan District, Wuxi, China was measured, as shown in FIG. 3. FIG. 3 shows that the soil thickness was 10-12 cm at the end of matrix spraying, and is now 15-18 cm after 9 years of treatment. This indicates that the planting soil layer grows thicker year by year and provides the plant system with nutrients.

Litters and rot grass increased the thickness of soil organic matter, and the remaining dust, animal waste and root growth increased the soil thickness. Overall, with the succession of plant communities, the soil layer grew thicker year by year.

(4) Soil and Water Conservation

1) Hydrological Function

The groundwater in the damaged mountain slope affected the slope stability in various ways, among which pore water pressure (PWP) was an important one. PWP changed the stress state and mechanical shape of the rock and soil particles on the slope, and could easily reduce the slope stability and even leads to slope instability. The roots of woody plants in nature were embedded in the rock (soil), and their transpiration significantly reduced the PWP of the soil, thereby protecting the slope stability. The leaves of trees and shrubs hindered the effect of rainfall. They absorbed and evaporated the rainwater through the foliage, thereby reducing the infiltration of rainwater (into the soil). The root system in the matrix absorbed the water in the soil, and brought the water into the atmosphere through transpiration, which reduced the PWP. The root system bound the soil particles on the slope, and the fibers and mineral particles in the matrix increased the roughness of the slope and reduced the probability of soil erosion.

2) Infiltration Capacity

Moisture enters the soil to form soil water. Experimental method: dye penetrant test (DPT); simulated total rainfall: 200 L; depth of excavated soil layer: 0-30 cm. The present invention increased the soil organic matter, improved the soil structure, and achieved excellent fertilizer retention performance. The matrix of the present invention provided a rich pore structure, which promoted soil looseness, and improved the water permeability of the soil. The present invention improved the vegetation cover, reduced surface soil loss, and exhibited almost perfect erosion control performance.

The present invention measured and evaluated the hydrological effect and infiltration capacity of the treated mountain slope face, and the results are shown in FIG. 4. FIG. 4 shows that the mountain slope repair method provided by the present invention had good erosion control performance. The present invention increased the flow resistance, minimized the soil loss, and reduced the runoff turbidity (NTU). In addition, the rich pore structure of the matrix had water retention and permeation functions and hydro-mechanical effects.

The loam-like matrix had a rich pore structure, providing water retention and infiltration functions to meet the requirements for vegetation growth. In the interaction with the near-surface atmosphere and with the surface-shallow soil, the vegetation exhibited corresponding hydro-mechanical effects, forming a certain erosion resistance on the slope. The loam-like matrix spraying technique was applied without fine classification and extensive soil treatment, which reduced the overall cost.

(5) Biological Protection

1) Reinforcement of Plant Roots

The roots of the trees prostrated in the sprayed loam-like matrix. The loam-like matrix was a flexible fiber-containing material, and the root-soil mixture was three-dimensional fiber-containing soil. Compared with the native soil, the root-soil mixture mixed with the roots increased the cohesion and internal friction angle of the soil, and improved the mechanical properties of the soil. Due to the large difference between the deformation modulus of the soil and the root system, the deformation of the root system was much smaller than the deformation of the soil. In order to coordinate the root system with the soil and constrain the deformation of the soil, the root system provided an additional cohesive force "$\Delta c$" to the soil layer, which greatly improved the shear strength $\tau$ of the root-containing soil ($\tau = \sigma \tan \varphi + c$), thereby promoting the slope stability.

2) Anchorage of Plant Roots

The trees had vertical root systems in the soil after the plant community was formed. The root systems had high tensile and shear strength, which enhanced the resistance of the root-soil composite to sliding. The vertical root systems integrated the unstable surface layer with the undamaged stable bearing rock (soil) layer, and transferred the slope stress to the lower rock (soil) layer to anchor and resist.

Figure 5:
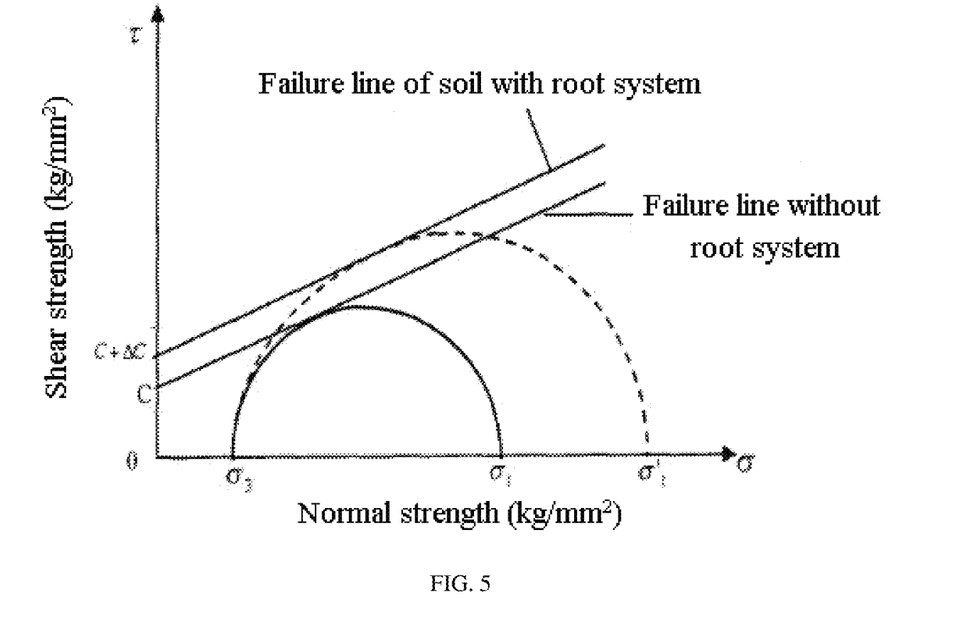
FIG. 5 shows a measurement and analysis result of reinforcement and anchorage effects of a root system on a mountain slope after treatment according to Example 3 of the present invention.

The reinforcement and anchorage effects of the root systems of the mountain slope face after treatment were measured and analyzed, as shown in FIG. 5. FIG. 5 shows that the mountain slope repair method provided by the present invention improved the reinforcement and anchorage of plant roots.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. A slope repair method, comprising the following steps:
    (1) pretreating a slope, so that an average roughness of the pretreated slope is from −8 to −12 cm for a depression and 8 to 12 cm for a protrusion per linear meter;
    (2) hanging a protective mesh on the pretreated slope, wherein a distance between the protective mesh and the slope is 3-4 cm, the protective mesh has an aperture size of 4-6 cm, vegetation mats with a size of (55-65) cm×(30-40) cm×(12-16) cm are filled between the protective mesh and the slope, and a distance between two of the vegetation mats on the slope is 150-250 cm; and
    (3) spraying a loam-like matrix on the slope with the protective mesh hanged, wherein the loam-like matrix comprises not less than 0.04 kg/m$^2$ of plant seeds; the plant seeds comprise tree seeds, shrub seeds and herb seeds with a mass ratio of (2.5-3.5):(4-6):(1.5-2.5) and wherein the loam-like matrix comprises topsoil, an organic fertilizer, activated carbon, a fibrous matter, a water-retaining agent, a binder, a matrix additive and plant seeds; the mass of the topsoil in the loam-like matrix is 110-130 kg/m$^2$; a mass of the organic fertilizer in the loam-like matrix is 3-5 kg/m$^2$; a mass of the activated carbon in the loam-like matrix is 0.3-0.5 kg/m$^2$; a mass of the fibrous matter in the loam-like matrix is 3-5 kg/m$^2$; a mass of the water-retaining agent in the loam-like matrix is 0.02-0.03 kg/m$^2$; a mass of the binder in the loam-like matrix is 0.01-0.016 kg/m$^2$; a mass of the matrix additive in the loam-like matrix is 0.005-0.015 kg/m$^2$; a mass of the plant seeds in the loam-like matrix is 0.04-0.05 kg/m$^2$;
    the matrix additive comprises a degradable polymer material mixture, volcanic soil, vermiculite and maifanite; the degradable polymer material mixture is prepared from the following raw materials of parts by mass: 10-15 parts of starch, 0.5-1.5 parts of gibberellin, 0.2-0.8 parts of chitin and 80-90 parts of water; the degradable polymer material mixture, the volcanic soil, the vermiculite and the maifanite have a mass ratio of 2:(0.5-1.5):(0.5-1.5):(1-4).

2. The slope repair method according to claim 1, wherein in step (2), the protective mesh is a 14-16 #galvanized iron wire mesh.

3. The slope repair method according to claim 2, further comprising 1-2 years of artificial maintenance after the loam-like matrix is sprayed.

4. The slope repair method according to claim 1, wherein in step (2), the protective mesh is fixed by anchor rods having a diameter of 8-10 mm and an anchoring length of 10-15 m; a distance of two of the anchor rods on the slope is 400-600 cm.

5. The slope repair method according to claim 4, wherein the slope is a mountain slope, primary anchors are provided at a distance of 0.8-1.2 m along a slope crest at a steep side of the slope; and the primary anchors have a diameter of 8-10 mm and an anchoring length of 10-15 cm.

6. The slope repair method according to claim 5, further comprising 1-2 years of artificial maintenance after the loam-like matrix is sprayed.

7. The slope repair method according to claim 4, further comprising 1-2 years of artificial maintenance after the loam-like matrix is sprayed.

8. The slope repair method according to claim 1, wherein in step (2), vegetation mats are filled between the protective mesh and the slope, which have a size of (55-65) cm×(30-40) cm×(12-16) cm; a distance between two of the vegetation mats on the slope is 150-250 cm.

9. The slope repair method according to claim 8, further comprising 1-2 years of artificial maintenance after the loam-like matrix is sprayed.

10. The slope repair method according to claim 1, wherein in step (3), the loam-like matrix comprises a bottom loam-like matrix and a surface loam-like matrix; a vertical thickness of the bottom loam-like matrix on the slope is 8-12 cm, and a total vertical thickness of the loam-like matrix on the slope is 12-16 cm.

11. The slope repair method according to claim 10, wherein the degradable polymer material mixture, the volcanic soil, the vermiculite and the maifanite of the matrix additive in the bottom loam-like matrix have a mass ratio of 2:(0.5-1.5):(0.5-1.5):(2-4).

12. The slope repair method according to claim 11, further comprising 1-2 years of artificial maintenance after the loam-like matrix is sprayed.

13. The slope repair method according to claim 10, wherein the degradable polymer material mixture, the volcanic soil, the vermiculite and the maifanite of the matrix additive in the surface loam-like matrix have a mass ratio of 2:(0.5-1.5):(0.5-1.5):(1-3).

14. The slope repair method according to claim 13, further comprising 1-2 years of artificial maintenance after the loam-like matrix is sprayed.

15. The slope repair method according to claim 10, further comprising 1-2 years of artificial maintenance after the loam-like matrix is sprayed.

16. The slope repair method according to claim 1, further comprising 1-2 years of artificial maintenance after the loam-like matrix is sprayed.

* * * * *